United States Patent [19]

Smith et al.

[11] Patent Number: 4,960,314
[45] Date of Patent: Oct. 2, 1990

[54] DIFFRACTION OPTICS DIFFUSING SCREEN LAMINATE FOR FULL COLOR ON-AXIS VIEWING

[75] Inventors: Ronald T. Smith, Redondo Beach; Ronald G. Hegg, Inglewood, both of Calif.

[73] Assignee: Hughes Aircraft Company, Los Angeles, Calif.

[21] Appl. No.: 214,986

[22] Filed: Jul. 5, 1988

[51] Int. Cl.⁵ .............................................. G02B 5/32
[52] U.S. Cl. .................. 350/3.7; 350/3.77; 350/3.85
[58] Field of Search .............. 350/3.7, 3.85, 3.86, 350/3.77, 162.11

[56] References Cited

U.S. PATENT DOCUMENTS

| | | | |
|---|---|---|---|
| 3,834,785 | 9/1974 | Kimura | 350/3.85 |
| 3,944,322 | 3/1976 | Benton | 350/3.85 |
| 4,179,182 | 12/1979 | Smith | 350/3.6 |
| 4,337,992 | 7/1982 | Johnson | 350/3.79 |
| 4,372,639 | 2/1983 | Johnson | 350/3.7 |
| 4,378,141 | 3/1983 | Yevick | 350/3.85 |
| 4,421,380 | 12/1983 | McGrew | 350/3.78 |
| 4,582,389 | 4/1986 | Wood et al. | 350/3.69 |
| 4,586,780 | 5/1986 | Chern et al. | 350/3.7 |
| 4,586,781 | 5/1986 | Gunther et al. | 350/3.7 |
| 4,610,499 | 9/1986 | Chern et al. | 350/3.7 |
| 4,623,214 | 11/1986 | Bazargan | 350/3.77 |
| 4,786,124 | 11/1988 | Stone et al. | 350/3.7 |

Primary Examiner—Rodney B. Bovernick
Assistant Examiner—R. D. Shafer
Attorney, Agent, or Firm—Leonard A. Alkov; Wanda K. Denson-Low

[57] ABSTRACT

An optical screen module for full-color, on axis viewing is described. The module has a transmission holographic optical element, a louver filter, and a diffraction optics diffusion screen. Input light is diffracted off-axis by the transmission holographic element, passed through the louver filter and rediffracted on-axis by the diffusion screen. The module can handle full-color light because the dispersion in the transmission hologram is compensated by that in the diffusion screen. The louver filter blocks the undiffracted zero-order light while allowing the light diffracted by the transmission hologram to pass through.

34 Claims, 1 Drawing Sheet

DIFFRACTION OPTICS DIFFUSING SCREEN LAMINATE FOR FULL COLOR ON-AXIS VIEWING

BACKGROUND OF THE INVENTION

The present invention relates to diffraction optics screen apparatus, and more particularly to an improved optical apparatus which provides the capabilities of full-color viewing, suppression of zero-order light, and on-axis viewing.

Diffraction optics diffusion screens employing holographic elements are well known in the art. U.S. Pat. No. 4,372,639 discloses a diffraction optics directional diffusing screen, for playback of light from a monochromatic light source. This type of screen employs a diffusion hologram, and exhibits a small and well-defined exit pupil, high and uniform gain across the exit pupil, and low backscatter. The light which passes through the holographic optical element without diffraction, known as zero-order light, illuminates the space in which the viewer is located to increase the ambient light level, which in many applications degrades the quality of viewing. Also, the viewing is off-axis, which may be undesirable for certain applications. Further, the simple diffusion hologram does not play back well in full-color. The white light incident on the hologram would be dispersed, i.e., diffracted at different angles for different wavelengths, creating a rainbow-like fan of colored light exiting each point on the hologram. Because the divergence of the projected beam onto the screen creates a wide variation in the incident angle, the resultant dispersion is so great that only a small overlap region between the red, green, and blue exit pupils is available for full-color viewing.

The problem of the zero-order light can be addressed by the addition of a fiberoptic faceplate, as shown in U.S. Pat. No. 4,586,781, assigned to the same assignee as the present application. The faceplate absorbs the zero-order light while transmitting the diffracted light, and scrambles the multicolored diffuse cones of light about its fiber axis to create a uniform full-color exit cone. The particular arrangement shown in U.S. Pat. No. 4,586,781 also provides off-axis viewing. The optical fibers of a conventional fiber optic faceplate are all oriented parallel to each other, so that the exiting diffuse cones of light are all parallel to one another. To obtain any appreciable overlapped full-color viewing region requires making the diffuse cones very large. The result is that much of the light is wasted and the main advantage of the holographic screen, its high gain, is severely compromised. One could use a lens on the front of the screen to achieve the focusing of the diffuse cones so as to preserve the high screen gain. However, a convex surface facing outward in a high ambient level environment is unacceptable, because it will reflect ambient light or sunlight from a wide range of positions directly into the viewer's exit pupil.

U.S. Pat. No. 4,586,780, also assigned to the same assignee as the present application, discloses a directional diffusing screen with suppressed zero-order light. The entire disclosure of U.S. Pat. No. 4,586,780 is incorporated herein by this reference. The optical apparatus described in this patent comprises a laminate of a transmission hologram, a fiber optic faceplate, and a holographic screen. Light incident on the transmission hologram is diffracted off-axis. The fiber optic faceplate is designed so that the diffracted light is parallel to the fiber axes and passes directly through the fibers without being scrambled about the fiber axis. However, the zero-order light undiffracted by the transmission hologram is absorbed by the faceplate. Light diffracted by the transmission hologram and passing through the faceplate are incident on the diffusion hologram and are diffracted back on-axis into a diffused exit pupil. This screen possesses many attractive features, including those of a simple diffraction optics diffusing screen, small and well-defined exit pupil, high and uniform gain, and low backscatter. In addition, it suppresses the zero-order light, blocks the ambient light from entering the display interior, and allows on-axis viewing (i.e., where the projection axis and viewing axis lie normal to the screen). However, one drawback of this optical apparatus is that it cannot be played back in full-color but requires near-monochromatic light. If one attempted to play back the screen in full color, white light incident on the transmission hologram would be dispersed, i.e., diffracted at different angles for different wavelengths, creating a rainbow-like fan of rays exiting each point on the transmission hologram. The rays from the transmission hologram would enter each optical fiber of the faceplate as a converging fan of rays. While passing through the optical fiber, they would be scrambled about the central axis of the fiber, so that they would exit the fiber as a circularly symmetric diverging cone of light. Since each optical fiber will emit a cone of light, and there are millions of optical fibers in the faceplate, the effect of the faceplate is to create a diffuse exit beam. This diffuse exit beam is incident on the diffusion hologram, which is only able to efficiently diffract non-diffuse light. The result is the diffusion hologram diffracts the input light only weakly, the resultant exit pupil is color blurred and larger than desired, and a substantial portion of the input light passes through the diffusion hologram undiffracted. The ultimate result is a dim, color-nonuniform screen.

It is therefore an object of this invention to provide a screen possessing the advantages of the directional diffraction optics diffusing screen, and which is in addition able to block the zero-order beam and allow on-axis full-color viewing.

SUMMARY OF THE INVENTION

In a preferred form, the invention comprises a screen laminate having several layers. The first layer is a transmission holographic element, the second layer is a louver filter, and the third layer is a diffraction optics diffusion screen. Input light is diffracted by the transmission hologram, and the diffracted light passes through the louver filter to the diffusing screen. The diffusing screen rediffracts this incident light to the viewer. The screen laminate can handle full-color light because the dispersion in the transmission hologram is compensated by that in the diffusion hologram. The louver filter blocks the undiffracted zero-order light while allowing the light diffracted by the transmission hologram to pass through.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE DISCLOSURE

Figure 1:
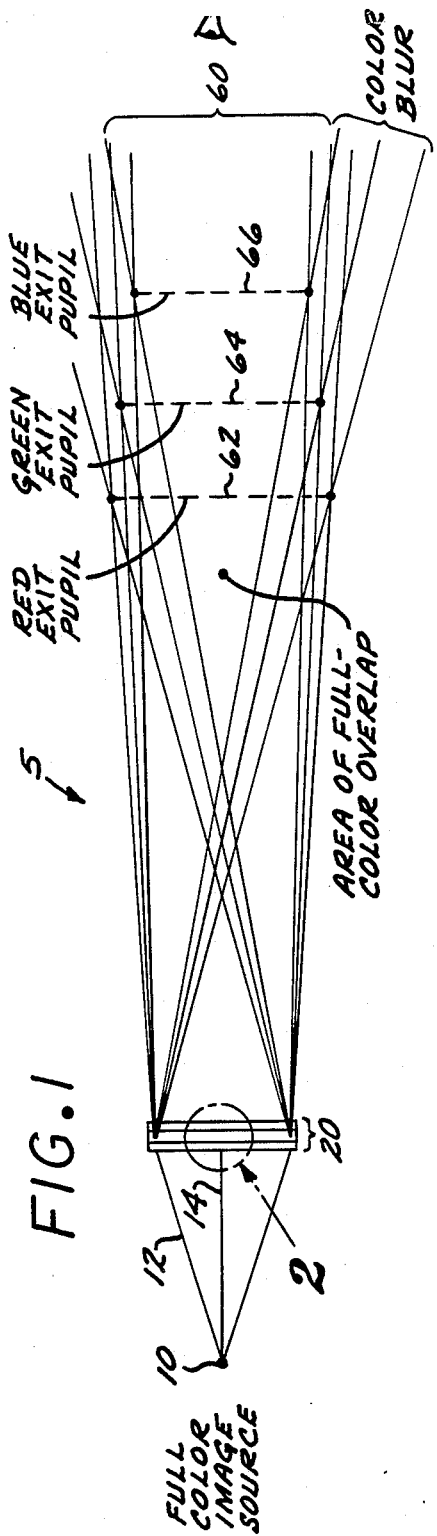
FIG. 1 is a schematic side elevational view of an optical system including the preferred embodiment of the invention.
Figure 2:
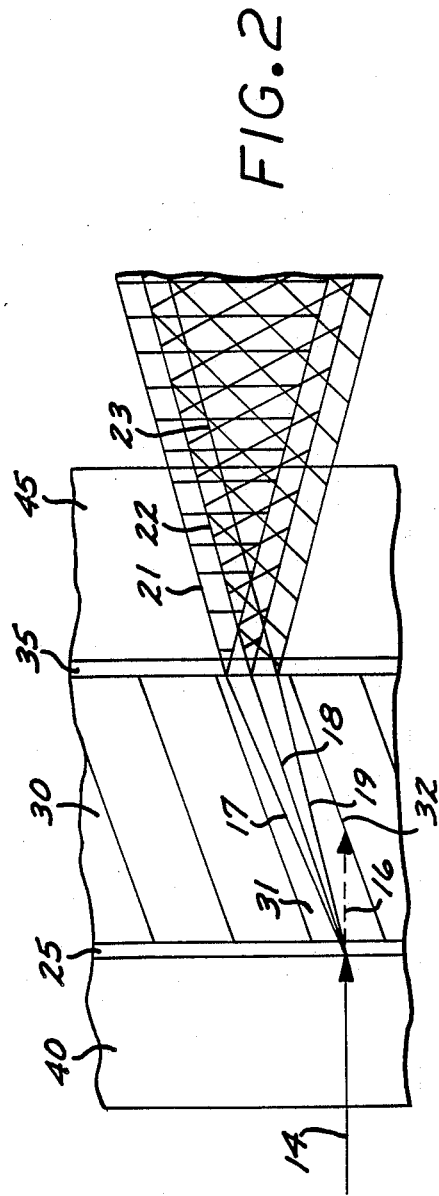
FIG. 2 is an enlarged detail of a cross-section of a portion of the structure within the phantom circle indicated by bold numeral 2 relative to the preferred embodiment shown in FIG. 1.

The preferred embodiment of the invention is illustrated in FIGS. 1 and 2. FIG. 1 illustrates optical system 5 in which a full color image source 10 projects a light beam 12 having a center ray 14 onto screen module 20. The image source 10 is typically substantially a point image source, and the beam 12 may encounter various optics, such as a collimating lens, before screen module 20. The beam 12 usually carries information in terms of color and brightness both spatially and temporally modulated. An example of an image source which may be employed advantageously is a liquid crystal matrix display.

The screen module 20 comprises a transmission hologram 25, a louver filter 30, and a diffusion hologram 35, laminated together between rigid glass support substrates 40 and 45. Transparent adhesive is utilized to join elements 25, 30 and 35 together into one optical assembly. The adhesive is typically index-matched to layers 25, 30 and 35 to prevent internal reflections between the various interfaces within structure 20.

The transmission hologram 25 is a holographic film, such as dichromated gelatin, and is mounted on rigid support substrate 40, typically made of optical glass. The diffusion holographic optical element 35 is also a holographic film, such as dichromated gelatin, and is mounted on rigid support substrate 45, also typically made of optical glass. As described in U.S. Pat. No. 4,586,780, a holographic sensitive plate is exposed to produce a latent image, and is then developed. In order to provide suitable exposure, interfering wavefronts within the plate cause a latent image which can be developed to cause minute internal modulations of refractive index and/or extinction coefficient.

As shown in the drawings, the transmission holographic element 25 and the diffusion holographic optical element 35 are disposed on opposite sides of the louver filter 30, to comprise the screen module 20. The slanted louver filter 30 allows the diffracted diffuse light from the transmission holographic element 25 to transmit through the filter 30 while blocking the zero-order light. The louver filter 30 is a "Venetian blind" type of device consisting of transparent cells 31 separated by opaque louvers or partitions 32.

One example of a louver filter which may be advantageously employed as filter 30 is the "Light Control Film" commercially available from the 3M Company. The Light Control Film is a thin flexible plastic film containing closely spaced black microlouvers. The thin film substrate is cellulose acetate butyrate. The product is available with several possible louver orientations, wherein maximum light transmission is, variously, at 0° (normal to the film surface), 18°, 30°, or 45° (all angles measured in air). The product is available in film thicknesses from 0.030 to 0.050 inches, louver spacing of 0.005 or 0.010 inches, and a louver thickness of 0.0005 inches. Using a Light Control Film with a film thickness of 0.030 inches, a louver orientation of 30° degrees, a louver spacing of 0.005 inches and a louver thickness of 0.0005 inches has been found to work well for the present application. Preferably, the louvers are spaced widely enough that full color light passes unimpeded through the filter and yet narrowly spaced enough to block the zero-order light and be spaced on the order of a pixel width.

The filter 30 is bonded to the transmission holographic element 25 and the diffusion holographic optical element 35. With the Light Control Film marketed by 3M used as the filter 30, the 3M polymerizing adhesive PA-4824 is preferably used to bond the filter to the elements 25 and 35. The use of this adhesive and its properties is disclosed in the data sheet issued by the Adhesives, Coatings and Sealers Division of 3M on Oct. 6, 1976.

The screen module 20 operates in the following manner. The white light beam 12 incident upon the transmission holographic element 25 is diffracted and dispersed by element 25 into a rainbow-like fan of rays in an off-axis direction, which is in the range of 17 to 23 degrees in this example. Thus, center ray 14 of beam 12 is dispersed into exemplary red ray 17, green ray 18, and blue ray 19, with ray 16 indicating the zero-order, undiffracted light (FIG. 2). Without element 30, the zero-order light ray 16 could pass through module 20 and directly into the exit pupil, degrading the performance of the module 20. The louvers 32 of the filter 30 are oriented properly with respect to the diffracted light rays 17–19, in this example at an angle of 19.7 degrees with respect to the center ray 14 of the incident beam, to pass the red, green and blue rays therethrough, while the zero-order ray encounters the opaque louver 32 and is blocked.

The fan of rays 17–19 diffracted from the center ray 14 by the transmission holographic element 25 and transmitted through the louver filter 30 are rediffracted by the diffusion holographic element 35 back on-axis and diffused into a well-defined exit pupil 60. The diffusion hologram also disperses the incident light but in an opposite and nearly equal manner to the transmission holographic element 25. The result is that the overall dispersion of the screen module 20 is small, and the red, green and blue pupils 62, 64 and 66 (FIG. 1) basically overlap, with only slight color blurring at the pupil edges. The louver filter 30 is thin enough in the disclosed embodiment that the pixel resolution is not appreciably degraded by the transmission hologram dispersion light.

The overlapping of the colored exit pupils is illustrated in FIGS. 1 and 2, with FIG. 1 illustrating the diffusion of the upper and lower edge red, green and blue rays to the respective exit pupils, and FIG. 2 showing in an enlarged detail the diffusion of the rays 17–19 dispersed from the central ray 14 by transmission hologram 25. Thus, red ray 17 is diffused into red light ray cone 21, the green ray 18 is dispersed into green light ray cone 22, and the blue ray 19 is dispersed into blue light ray cone 23. The light cones 21–23, respectively, illuminate the red, green and blue exit pupils 62, 64 and 66.

The transmission holographic element 25 and the diffusion holographic element 35 are identical to the corresponding elements described in U.S. Pat. No. 4,586,780, and can be fabricated using the same techniques described in U.S. Pat. No. 4,586,780, e.g., at column 6, line 25 through column 7, line 18, with reference to FIGS. 5 and 6 of that patent.

Thus, a new screen module has been described which provides all the advantages of the optical apparatus described in U.S. Pat. No. 4,586,780, but which also allows for full-color viewing, which is very important for display applications. By adjusting the gelatin thickness of the holographic optical elements and the bend angle (i.e., the angle between an incident light ray and the center of the diffracted cone) for the transmission hologram and the diffusion hologram, the spectral bandwidth of the screen module can be designed to be broad, so that light over the full visible spectrum can be diffracted efficiently.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. An optical apparatus comprising:
  a transmission holographic optical element comprising means for diffracting a portion of a beam of multi-color light incident on said element to redirect the diffracted light so that it exits from said element at acute angles relative to the remaining portion of the incident beam;
  an optical louver filter positioned with respect to said transmission holographic element so that light passing through said element is incident on said louver filter, said filter comprising a plurality of transparent cells separated by opaque louvers, said louvers being cooperatively arranged with respect to the diffracted light from said transmission holographic optical element so that diffracted multi-color light passes unimpeded through said filter and zero-order light is blocked by said louvers; and
  a diffraction optics holographic optical diffusion screen supported adjacent said louver filter and comprising means for diffusively diffracting light exiting said filter toward a predetermined exit pupil so that light diffracted by said optical diffusion screen is substantially directed toward and illuminates said exit pupil.

2. The optical apparatus of claim 1 wherein said transmission holographic element is supported on a first rigid glass substrate, and said diffraction optics holographic diffusion screen is supported on a second rigid glass substrate, and wherein said first and second substrates sandwich said transmission holographic element, said louver filter and said diffraction optics diffusion screen.

3. The optical apparatus of claim 1 wherein said means for diffracting a portion of a beam of light incident on said transmission holographic optical element comprises a holographic dichromated gelatin film.

4. The optical apparatus of claim 1 wherein said means for diffusively diffracting light exiting said filter comprises a holographic dichromated gelatin film.

5. An optical apparatus comprising:
  a full-color image source projector for projecting a beam of full-color image-information-bearing light;
  a transmission holographic optical element comprising means disposed with respect to said image source projector for diffracting a portion of said beam to redirect said diffracted light beam so that it exits from said element at acute angles relative to the remaining portion of said beam incident on said transmission holographic optical element;
  an optical louver filter positioned with respect to said transmission holographic element so that light passing through said element is incident on said louver filter, said filter comprising a plurality of transparent cells separated by opaque louvers, said louvers being cooperatively arranged with respect to the diffracted light from said transmission holographic optical element so that the diffracted light passes unimpeded through said filter and zero-order light is blocked by said louvers; and
  a diffraction optics holographic optical diffusion screen supported adjacent said louver filter and comprising means for diffusively diffracting light exiting said filter toward a predetermined exit pupil so that light diffracted by said optical diffusion screen is substantially directed toward and illuminates said exit pupil.

6. The optical apparatus of claim 5 wherein said transmission holographic element is supported on a first rigid glass substrate, and said diffraction optics holographic diffusion screen is supported on a second rigid glass substrate, and wherein said first and second substrates sandwich said transmission holographic element, said louver filter and said diffraction optics diffusion screen.

7. The optical apparatus of claim 5 wherein said means for diffracting a portion of said beam of light comprises a holographic dichromated gelatin film.

8. The optical apparatus of claim 5 wherein said means for diffusively diffracting light exiting said filter comprises a holographic dichromated gelatin film.

9. The optical apparatus of claim 1 wherein light is incident on said apparatus along an incident axis which is substantially normal to said transmission holographic optical element, and said louvers are slanted with respect to said incident axis and are spaced apart by a distance such that the multi-color light diffracted by said transmission holographic optical element passes through said louver filter without reflection by said louvers, and the zero-order light is blocked by said louvers.

10. The optical apparatus of claim 9 wherein the angle at which said louvers are slanted with respect to said incident axis is about 30 degrees.

11. The optical apparatus of claim 1 wherein said louvers are spaced apart by about 0.005 inches.

12. The optical apparatus of claim 1 wherein said optical louver filter has a thickness in the range of 0.030 to 0.050 inches.

13. The optical apparatus of claim 1 wherein said beam of light is incident on said optical apparatus along a projection axis which is substantially normal to said transmission holographic optical element, and said exit pupil lies on a viewing axis extending substantially normal to said diffusion screen.

14. The optical apparatus of claim 5 wherein said louvers are spaced apart by about 0.005 inches.

15. The optical apparatus of claim 5 wherein said optical louver filter has a thickness in the range of 0.030 to 0.050 inches.

16. The optical apparatus of claim 5 wherein said beam of light is incident on said optical apparatus along a projection axis which is substantially normal to said transmission holographic optical element, and said exit pupil lies on a viewing axis extending substantially normal to said diffusion screen.

17. The optical apparatus of claim 5 wherein light is incident on said apparatus along an incident axis which is substantially normal to said transmission holographic optical element, and said louvers are slanted with respect to said incident axis and are spaced apart by a distance such that the full-color light diffracted by said transmission holographic optical element passes through said louver filter without reflection by said louvers, and the zero-order light is blocked by said louvers.

18. The optical apparatus of claim 17 wherein the angle at which said louvers are slanted with respect to said incident axis is about 30 degrees.

19. A diffraction optics diffusing screen laminate for full-color on-axis viewing, comprising:
a transmission holographic optical element comprising means for diffracting a portion of a beam of full-color light incident on said element along an incident axis substantially normal to said element to redirect the diffracted light so that it exits from said element at acute angles relative to the remaining portion of the incident beam;
an optical louver filter positioned with respect to said transmission holographic element so that light passing through said element is incident on said louver filter, said filter comprising a plurality of transparent cells separated by opaque louvers, said louvers being cooperatively arranged with respect to the diffracted light from said transmission holographic optical element so that diffracted full-color light passes unimpeded through said filter and zero-order light is blocked by said louvers; and
a diffraction optics holographic optical diffusion screen supported adjacent said louver filter and comprising means for diffusively diffracting light exiting said filter toward a predetermined exit pupil lying on a viewing axis extending substantially normal to said screen so that light diffracted by said optical diffusion is substantially directed toward and illuminates said exit pupil.

20. The screen laminate of claim 19 wherein said transmission holographic element is supported on a first rigid glass substrate, and said diffraction optics holographic diffusion screen is supported on a second rigid glass substrate, and wherein said first and second substrates sandwich said transmission holographic optics diffusion screen.

21. The screen laminate of claim 19 wherein said means for diffracting a portion of a beam of light incident on said transmission holographic optical element comprises a holographic dichromated gelatin film.

22. The screen laminate of claim 19 wherein said means for diffusively diffracting light exiting said filter comprises a holographic dichromated gelatin film.

23. The optical apparatus of claim 19 wherein said louvers are spaced apart by about 0.005 inches.

24. The optical apparatus of claim 19 wherein said optical louver filter has a thickness in the range of 0.030 to 0.050 inches.

25. The optical apparatus of claim 19 wherein light is incident on said apparatus along an incident axis which is substantially normal to said transmission holographic optical element, and said louvers are slanted with respect to said incident axis and are spaced apart by a distance such that the full-color light diffracted by said transmission holographic optical element passes through said louver filter without reflection by said louvers, and the zero-order light is blocked by said louvers.

26. The optical apparatus of claim 25 wherein the angle at which said louvers are slanted with respect to said incident axis is about 30 degrees.

27. A diffraction optics multi-color on-axis display system, comprising:
a multi-color image source projector for projecting a beam of multi-color image-information-bearing light along a projection axis;
a transmission holographic optical element comprising means disposed with respect to said image source projector for diffracting a portion of said beam to redirect said diffracted light beam so that it exits from said element at acute angles relative to the remaining portion of said beam incident on said transmission holographic optical element, said projection axis extending substantially normal to said optical element;
an optical louver filter positioned with respect to said transmission holographic element so that light passing through said element is incident on said louver filter, said filter comprising a plurality of transparent cells separated by opaque louvers, said louvers being cooperatively arranged with respect to the diffracted light from said transmission holographic optical element so that diffracted light passes unimpeded through said filter and zero-order light is blocked by said louvers; and
a diffraction optics holographic optical diffusion screen supported adjacent said louver filter and comprising means for diffusively diffracting light exiting said filter toward a predetermined exit pupil lying on a viewing axis extending substantially normal to said screen and substantially parallel to said projection axis so that light diffracted by said optical diffusion screen is substantially directed toward and illuminates said exit pupil.

28. The display system of claim 27 wherein said transmission holographic element is supported on a first rigid glass substrate, and said diffraction optics holographic diffusion screen is supported on a second rigid glass substrate, and wherein said first and second substrates sandwich said transmission holographic element, said louver filter and said diffraction optics diffusion screen.

29. The display system of claim 27 wherein said means for diffracting a portion of said beam of light comprises a holographic dichromated gelatin film.

30. The display system of claim 27 wherein said means for diffusively diffracting light exiting said filter comprises a holographic dichromated gelatin film.

31. The display system of claim 27 wherein said louvers are spaced apart by about 0.005 inches.

32. The display system of claim 27 wherein said optical louver filter has a thickness in the range of 0.030 to 0.050 inches.

33. The display system of claim 27 wherein light is incident on said apparatus along an incident axis which is substantially normal to said transmission holographic optical element, and said louvers are slanted with respect to said incident axis and are spaced apart by a distance such that the multi-color light diffracted by said transmission holographic optical element passes through said louver filter without reflection by said louvers, and the zero-order light is blocked by said louvers.

34. The display system of claim 33 wherein the angle at which said louvers are slanted with respect to said incident axis is about 30 degrees.

* * * * *